(12) United States Patent
Heathcott et al.

(10) Patent No.: US 7,470,094 B2
(45) Date of Patent: Dec. 30, 2008

(54) GEONET FOR A GEOCOMPOSITE

(75) Inventors: Dino Heathcott, Kingstree, SC (US);
Dhani Narejo, Monroe, TX (US); Rick Schaefer, The Woodlands, TX (US);
Boyd Ramsey, The Woodlands, TX (US)

(73) Assignee: GSE Lining Technology, Inc., Houston, TX (US)

( * ) Notice: Subject to any disclaimer, the term of this patent is extended or adjusted under 35 U.S.C. 154(b) by 150 days.

(21) Appl. No.: 11/271,396

(22) Filed: Nov. 10, 2005

(65) Prior Publication Data

US 2007/0104543 A1 May 10, 2007

(51) Int. Cl.
*E02D 17/20* (2006.01)

(52) U.S. Cl. .............................. 405/302.7; 405/129.95; 405/129.85

(58) Field of Classification Search .............. 405/302.6, 405/302.7, 129.45, 129.55, 129.6, 129.75, 405/129.9, 129.95
See application file for complete search history.

(56) References Cited

U.S. PATENT DOCUMENTS

| | | | |
|---|---|---|---|
| 3,922,329 A | 11/1975 | Kim et al. | |
| 3,949,111 A | 4/1976 | Pelletier | |
| 4,421,439 A * | 12/1983 | ter Burg et al. | 405/302.7 |
| 4,472,086 A * | 9/1984 | Leach | 405/302.7 |
| 4,662,946 A * | 5/1987 | Mercer | 405/302.7 |
| 4,749,306 A * | 6/1988 | Demeny et al. | 405/45 |
| 4,768,897 A * | 9/1988 | Nussbaumer et al. | 405/129.9 |
| 4,837,387 A * | 6/1989 | van de Pol | 405/302.7 |
| 5,255,998 A * | 10/1993 | Beretta | 405/302.7 |
| 5,267,816 A * | 12/1993 | Mercer et al. | 405/302.7 |
| 5,298,214 A * | 3/1994 | Morrow et al. | 264/211.12 |
| 5,401,552 A | 3/1995 | Bohrer et al. | |
| 5,419,659 A * | 5/1995 | Mercer | 405/302.7 |
| 5,601,906 A * | 2/1997 | Henry | 405/107 |
| 5,795,835 A | 8/1998 | Bruner et al. | |
| 5,851,089 A * | 12/1998 | Beretta | 405/302.7 |
| 6,056,479 A * | 5/2000 | Stevenson et al. | 405/302.7 |
| 6,095,720 A * | 8/2000 | Stark | 405/43 |
| 6,139,955 A * | 10/2000 | Girgis | 405/302.7 |
| 6,171,984 B1 * | 1/2001 | Paulson et al. | 405/15 |
| 6,505,996 B1 | 1/2003 | Ianniello et al. | |
| 6,736,568 B1 * | 5/2004 | Pugh et al. | 405/43 |
| 6,802,669 B2 | 10/2004 | Ianniello et al. | |
| 6,802,672 B2 | 10/2004 | Hardin et al. | |
| 6,989,097 B2 * | 1/2006 | Karode et al. | 210/493.4 |
| 2005/0158123 A1 | 7/2005 | Ianniello et al. | |

FOREIGN PATENT DOCUMENTS

| | | |
|---|---|---|
| GB | 2 259 048 A | 3/1993 |
| WO | WO/97/02131 | 2/1997 |
| WO | WO 98/05491 | 2/1998 |

\* cited by examiner

*Primary Examiner*—Frederick L Lagman
(74) *Attorney, Agent, or Firm*—Wood, Phillips, Katz, Clark & Mortimer

(57) ABSTRACT

A geocomposite for use in a landfill, including a geonet and a geotextile bonded to at least one side of the geonet. The geonet includes a first plurality of substantially parallel strands, and a second plurality of substantially parallel strands disposed on top of the first plurality of strands, the second plurality of strands being at an angle relative to the first plurality of strands. The first and second plurality of strands are substantially incompressible and secured to one another at crossover locations, and are substantially round in cross-section.

18 Claims, 3 Drawing Sheets

GEONET FOR A GEOCOMPOSITE

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward geocomposites for use in geotechnical construction sites, and particularly toward geonets usable with geotextiles in forming such geocomposites.

BACKGROUND OF THE INVENTION AND TECHNICAL PROBLEMS POSED BY THE PRIOR ART

Geotechnical engineering and the usage of geosynthetic materials are very common in today's civil engineering marketplace. One of the most common geosynthetic materials available today are drainage products. Drainage products are generally comprised of a geonet or a geonet combined with a filtration fabric which may be one of many varieties. These products are used for a broad variety of applications. Common applications include drainage/leachate collection layers in waste storage facilities, leak detection layers in waste storage facilities, the use of a geosynthetic drainage material for gas venting in water and wastewater storage and treatment facilities, the use of geosynthetic drainage layers in roadway, rail and transportation applications and many others. In all of these applications, there are generally two performance factors which determine the suitability of the drainage media. These performance factors are the transmissivity (flow capacity) of the drainage media and the maximum allowable overburden pressure which the drainage media can support and still perform the functions required of it.

Waste collection sites are, of course, one well known type of geotechnical construction site, and are unavoidably required in today's societal structures. Such sites can require large amounts of valuable land, particularly in urban areas where land is most in demand. Also, while desirable uses can be made of such lands (for example, golf courses have been built on such sites), such desirable uses typically have to wait until the land is no longer being used to collect further waste and the often high pile of waste has stabilized. While use and stabilization of such sites can take many years, there is nevertheless a desire to have that accomplished as quickly as possible, not only to increase the safety of those who might have to be at the site but also to allow for the desired use of others (for example, golfers) and to enhance the environment of those who live in the area as soon as is reasonably possible.

Toward that end, bioreactor landfills have been used to modify solid waste landfills by re-circulating and injecting leachate/liquid and air to enhance the consolidation of waste and reduce the time required for landfill stabilization. To accomplish this, generally horizontal flow of the leachate/liquid beneath the surface of the landfill is required. In some instances, vertical injection pipes and horizontal pipe fields have often been used to facilitate this leachate/liquid flow. With these structures, a liner is commonly provided at the bottom of the site, which liner may be used to trap leachate which has run through the collected waste above, with pipes in that area used to collect the leachate and draw it out for re-circulation by pumping it out and distributing/dispersing the leachate back into the upper portions of the waste site through, for example, perforated pipes and/or horizontal trenches.

Unfortunately, vertical injection pipes and horizontal pipe fields have been costly, time consuming to install and maintain, and not entirely effective for a number of reasons. U.S. Pat. No. 6,802,672 discloses an advantageous system which addresses such problems.

Moreover, geocomposites have heretofore been used with many different types of systems where it is desirable to provide for fluid flow below the surface of built up land masses. As shown in FIGS. 1-3, such prior art geocomposites 10 have, for example, included a geonet 12 having high density polyethylene (HDPE) longitudinal strands 14 in the form of a grid 16 (see FIG. 1), with geotextiles 18 (such as, e.g., nonwoven needlepunched geotextiles) secured to one or both sides of the geonet (see FIG. 3). The geonet strands 14 have been long and oblong in cross-section, and oriented with the long dimension in a generally vertical orientation (see FIGS. 2-3), whereby the strands 14 provide a height for the geonet 12 which serves to facilitate flow along the plane of the geocomposite. However, while the strands 14 are themselves substantially incompressible HDPE, it has been the experience in the industry that under higher loading (which occurs, e.g., under greater depths of fill and/or pressures above the geocomposite), the rate of fluid flow along the plane of the geocomposite may be substantially reduced to undesirably low levels, which reduced flow can significantly inhibit the desired benefits of, for example, fluid drainage or recirculation.

The present invention is directed toward overcoming one or more of the problems set forth above.

SUMMARY OF THE INVENTION

In one aspect of the present invention, a geonet for use in a landfill is provided, including a first plurality of substantially parallel strands, and a second plurality of substantially parallel strands disposed on top of the first plurality of strands, the second plurality of strands being at an angle relative to the first plurality of strands. The first and second plurality of strands are substantially incompressible and secured to one another at crossover locations, and at least one of the first and second plurality of strands is substantially round in cross-section.

In one form of this aspect of the present invention, the strands are high density polyethylene (HDPE).

In another form of this aspect of the present invention, both of the first and second plurality of strands are substantially round in cross-section.

In still another form of this aspect of the present invention, a geotextile is bonded to at least one side of the of the geonet.

In another aspect of the present invention, a geocomposite for use in geotechnical applications is provided, including a geonet and a geotextile bonded to at least one side of the geonet. The geonet includes a first plurality of substantially parallel strands, and a second plurality of substantially parallel strands disposed on top of the first plurality of strands, the second plurality of strands being at an angle relative to the first plurality of strands. The first and second plurality of strands are substantially incompressible and secured to one another at crossover locations, and at least one of the first and second plurality of strands is substantially round in cross-section.

In one form of this aspect of the present invention, the strands are high density polyethylene (HDPE).

In another form of this aspect of the present invention, both of the first and second plurality of strands are substantially round in cross-section.

In still another form of this aspect of the present invention, a geotextile is non-woven textile heat laminated to the geonet strands. In a further form, the strands are high density polyethylene (HDPE). In another further form, the geotextile is non-woven needlepunched textile heat laminated to strands on both sides of the geonet and, in a still further form, the strands are high density polyethylene (HDPE).

In yet another form of this aspect of the present invention, the geotextile is spun-bonded or heat laminated textile heat laminated to strands on both sides of the geonet and, in a further form, the strands are high density polyethylene (HDPE).

In still another aspect of the present invention, a landfill comprising alternating layers of fill and geocomposites is provided, where the geocomposites are each disposed beneath a layer of fill to facilitate draining of liquid from the landfill. The geocomposites include a geonet and a geotextile bonded to at least one side of the geonet. The geonet includes a first plurality of substantially parallel strands, and a second plurality of substantially parallel strands disposed on top of the first plurality of strands, the second plurality of strands being at an angle relative to the first plurality of strands. The first and second plurality of strands are secured to one another at crossover locations, and at least one of the first and second plurality of strands is substantially round in cross-section.

In one form of this aspect of the present invention, the strands are high density polyethylene (HDPE).

In another form of this aspect of the present invention, both of the first and second plurality of strands are substantially round in cross-section.

In still another form of this aspect of the present invention, a geotextile is non-woven needlepunched textile heat laminated to strands on both sides of the geonet and, in a further form, the strands are high density polyethylene (HDPE).

DETAILED DESCRIPTION OF THE INVENTION

Figure 4:
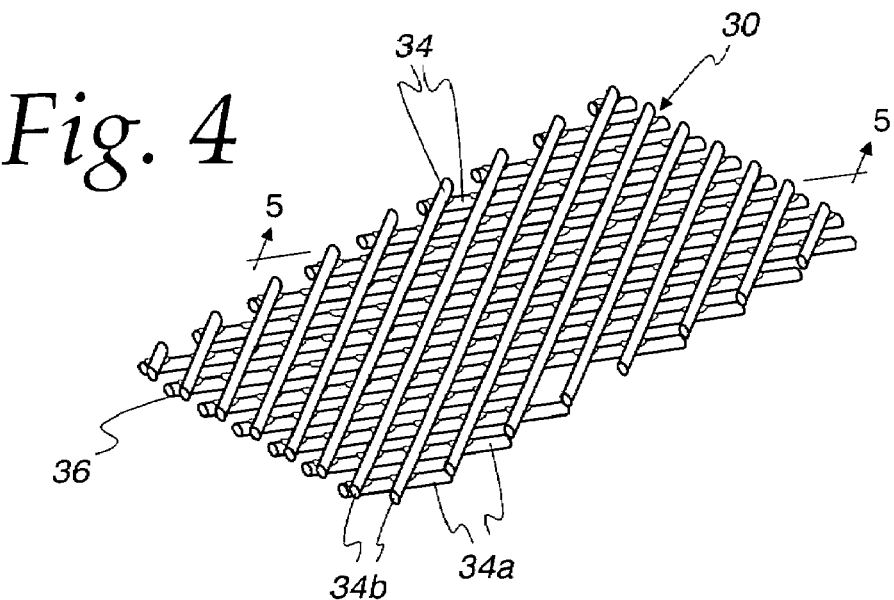
FIG. 4 is a perspective view of one embodiment of a geonet according to the present invention.
Figure 5:
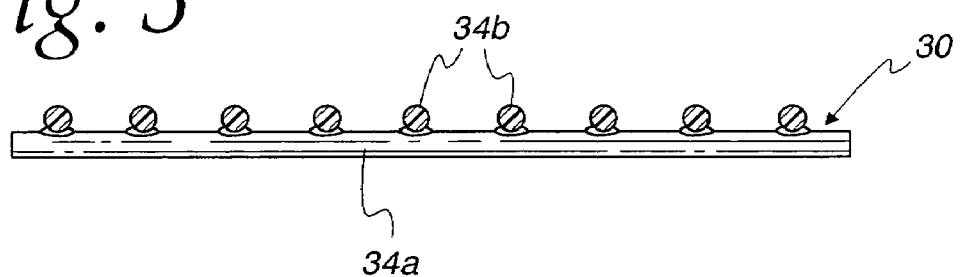
FIG. 5 is a cross-sectional view of the geonet of the present invention, taken along line 5-5 of FIG. 4.

A geonet 30 according to the present invention is shown in FIGS. 4-5. The geonet 30 consists of substantially incompressible longitudinal strands 34 (e.g., formed of high density polyethylene [HDPE]), including a lower set of a plurality of substantially parallel strands 34a and an upper set of a plurality of substantially parallel strands 34b, with the two sets of strands 34a, 34b being at an angle relative to one another whereby a crisscrossed grid 36 is formed (see FIG. 4). It should be understood that as used herein, "substantially incompressible" is meant to refer to materials such as HDPE which, though susceptible to bending, breaking, fracture and/or creep, does not appreciably compress in the vertical direction when vertical forces are applied.

At their overlapping intersection, the strands 34a, 34b are suitably secured together whereby a relatively rigid geonet 30 is provided in the plane of the geonet 30 (i.e., the geonet 30 is substantially rigid against compressive forces directed along the plane of the geonet 30, while still providing some flexibility for bending when laid on uneven ground).

In accordance with the present invention, the strands 34a, 34b of the geonet 30 are substantially round in cross-section with connected areas 38 at the overlapping intersections. Advantageously, the diameter of the strands 34a, 34b may, for a given design use, be substantially the same as the longer dimension of the prior art flat strands as described with respect to FIGS. 1-3.

As a result of this configuration, it has been found that at higher pressures such as 15,000 pounds per square foot or more, such as may be encountered in site designs involving several hundred thousand to over a million square feet and projected overburden heights of zero to over two hundred feet, significantly greater fluid flow along the generally horizontal geonet 30 may be provided than with comparable prior art geonets. It is believed that with geonets 30 configured as with the present invention, the round strands 34a, 34b will provide a reliable height of the geonet 30 and thereby serve to facilitate flow along the plane of the geocomposite. By contrast, with the prior art strands 14 shown in FIGS. 1-3, even though they are themselves substantially incompressible HDPE, creep of the strands 14 of such geonets will, eventually, result in the strands 14 folding over in a relatively short amount of time once begun. For example, testing has shown that under loading of 7500 to 15,000 psi, the strands 14 of such geonets 12 may be caused to fold over flat in 10,000 hours or less. Such rollover will, of course, cause the two groups of strands 14 to present a height which is substantially less than the combined long dimension of two sets of strands and thereby significantly and undesirably reducing the transmissivity (flow capacity) provided by such prior art geocomposite 10.

Figure 1:
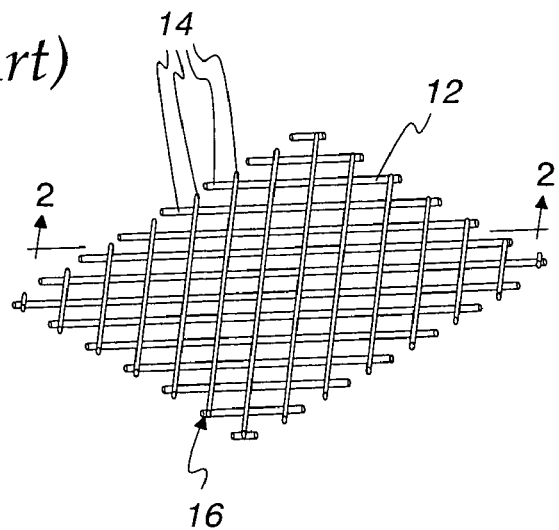
FIG. 1 is a perspective view of a prior art geonet.
Figure 2:
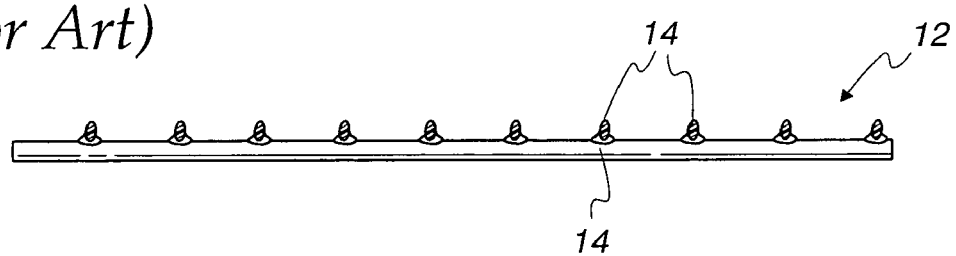
FIG. 2 is a cross-sectional view of the FIG. 1 prior art geonet, taken along line 2-2 of FIG. 1.
Figure 3:
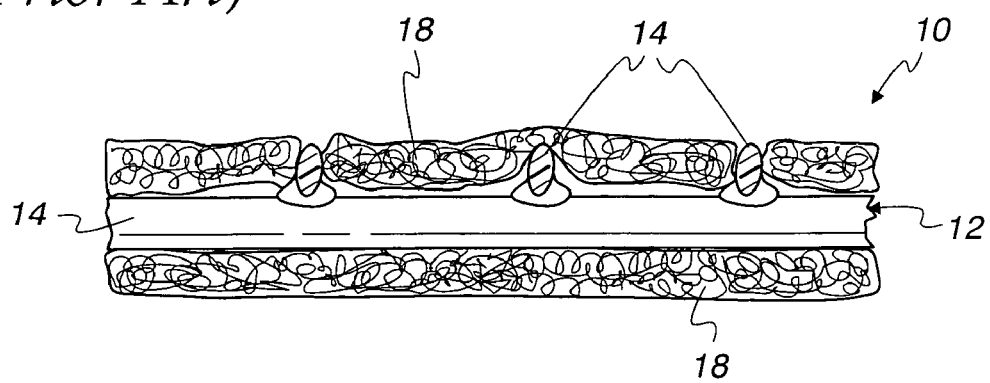
FIG. 3 is an enlarged cross-section view of a geocomposite including the geonet of FIGS. 1-2.

Testing has also shown that at higher loadings such as 30,000 psi, transmissivity for geonets according to the present invention is higher than it is for prior art geonets of FIGS. 1-3 having comparable material usages (i.e., transmissivity per mass per unit area is greater with the geonets of the present invention).

Figure 6:
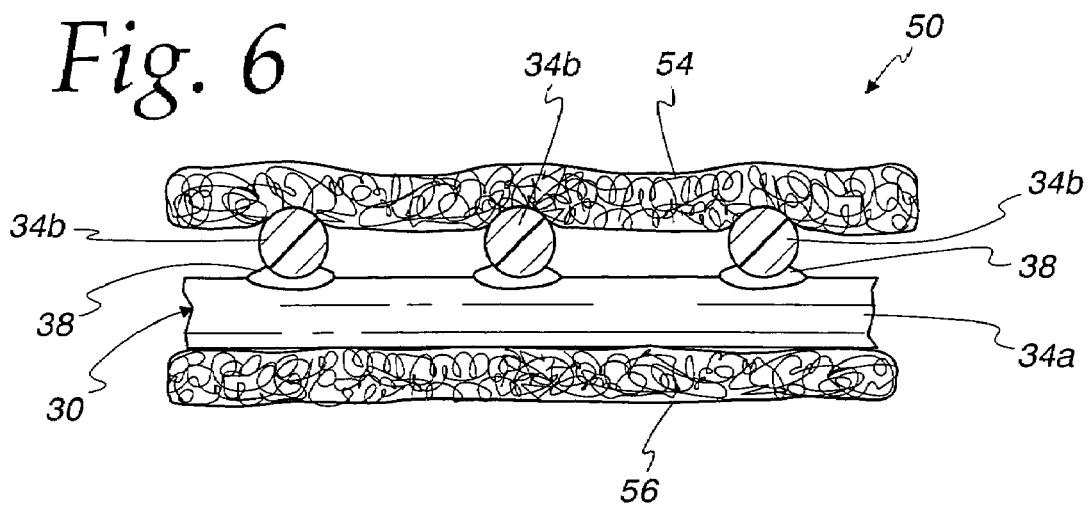
FIG. 6 is an enlarged cross-section view of a geocomposite according to the present invention including the geonet of FIGS. 4-5.

A geocomposite 50 incorporating the geonet 30 of the present invention is shown in FIG. 6. In the illustrated geocomposite 50, geotextiles 54, 56 (such as, e.g., nonwoven needlepunched geotextiles, spun-bonded or heat laminated textiles, as are known in the art) are suitably secured to both sides of the geonet 30, such as by heat laminating.

Figure 7:
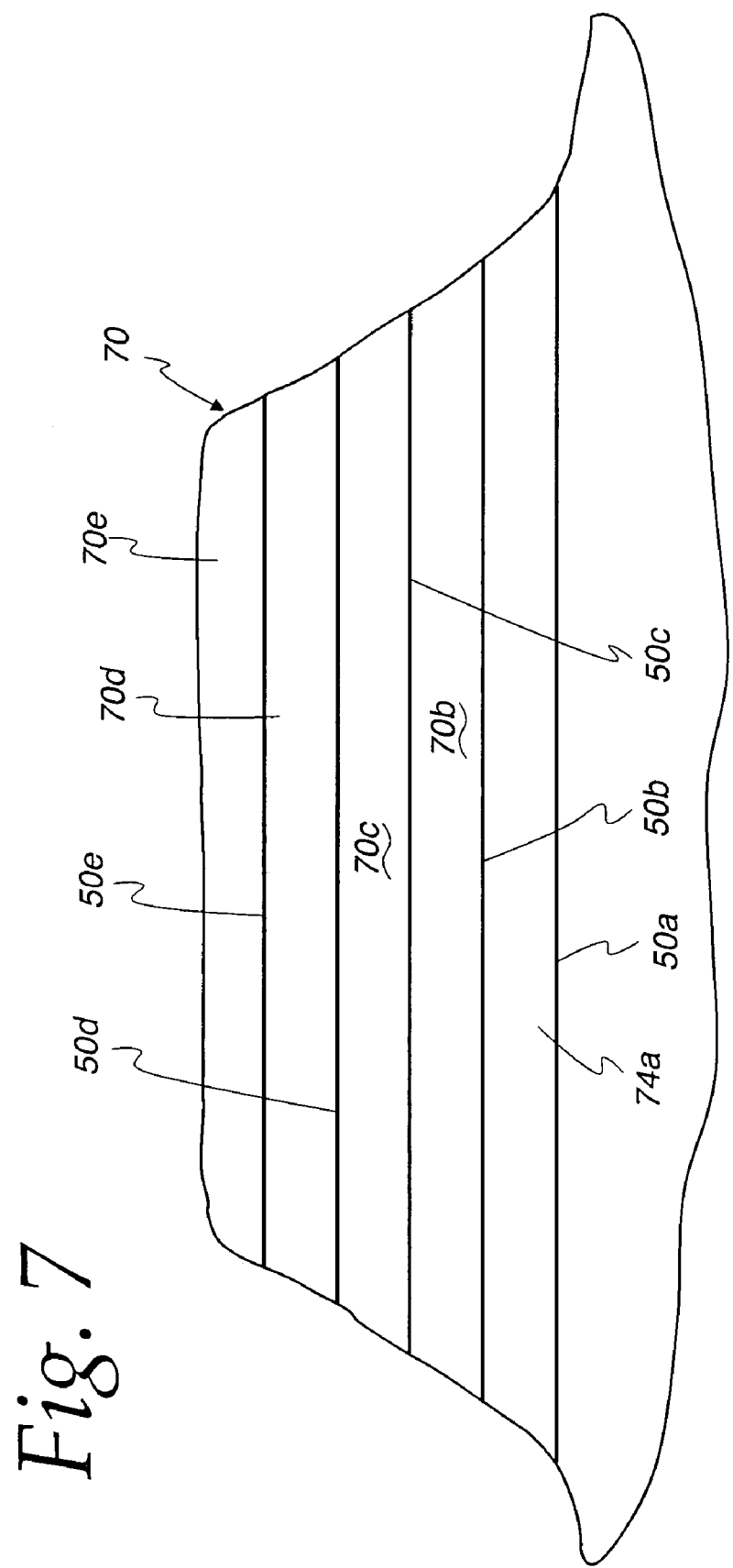
FIG. 7 is a cross-section of a landfill in which the geocomposite of the present invention is used.

FIG. 7 illustrates, in cross-section, a landfill 70 in which geocomposites 50 according to the present invention may be advantageously used. As the landfill is made, a first layer of geocomposites 50a is laid down on the surface of the area on which the landfill 70 is being formed. Of course, the area being covered may be extremely large, and therefore more than one section of geocomposite 50a will typically be required to cover the entire area at each layer. Fill 74a will then be placed on top of the geocomposite 50a to a desired depth such as is known in the art, and then a second layer of geocomposites 50b is then laid down on that area. Further layers of fill 70b-70e and geocomposites 50c-50e are similarly added according to the design of the landfill 70. As is known to those skilled in the art, geocomposites 50a-50e such as illustrated may be used to facilitate fluid flow through the landfill 70. Moreover, other structures, such as pumps and vertical and horizontal pipes, may also be used in conjunction with such geocomposites 50a-50e to intentionally circulate leachate through the landfill and thereby facilitate stabilization of the landfill 70 so that it may thereafter be returned to other productive uses more quickly. Further, geocomposites 50 only about 0.200 inch thick may be used, for example, in place of twelve inch layers of sand and aggregate, thereby requiring much less height and concomitantly having less environmental impact and/or allowing for more fill (e.g., waste in a landfill).

Geocomposites 50 such as described herein may be advantageously used particularly in large landfills where they are subjected to high pressures over long periods of time. However, it should further be understood that geonets 30 and geocomposites 50 according to the present invention, though advantageously usable in geotechnical construction sites such as landfills 70 as described above, may also be advantageously usable in a wide variety of geotechnical construction sites, including not only common horizontal orientations facilitating drainage over a site but also vertical orientations such as in mechanically stabilized earth walls.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A geonet for use in a geotechnical construction site, consisting of:
    a first plurality of substantially parallel strands substantially uniformly spaced from one another;
    a second plurality of substantially parallel strands substantially uniformly spaced from one another and disposed on top of said first plurality of strands, said second plurality of strands being at an angle relative to said first plurality of strands;
    whereby said first and second plurality of strands are substantially incompressible and secured to one another by connected areas at crossover locations, and at least one of said first and second plurality of strands is substantially round in cross-section.

2. The geonet of claim 1, wherein said strands are high density polyethylene (HDPE).

3. The geonet of claim 1, wherein both of said first and second plurality of strands are substantially round in cross-section.

4. A geocomposite for use in a geotechnical construction site, comprising:
    a geonet consisting of
        a first plurality of substantially parallel strands, and
        a second plurality of substantially parallel strands disposed on top of said first plurality of strands, said second plurality of strands being at an angle relative to said first plurality of strands,
        whereby said first and second plurality of strands are substantially incompressible and secured to one another by connected areas at crossover locations, and at least one of said first and second plurality of strands is substantially round in cross-section; and
    a geotextile bonded to at least one side of said of said geonet.

5. The geocomposite of claim 4, wherein said strands are high density polyethylene (HDPE).

6. The geocomposite of claim 4, wherein both of said first and second plurality of strands are substantially round in cross-section.

7. The geocomposite of claim 4, wherein said geotextile is non-woven textile heat laminated to said geonet strands.

8. The geocomposite of claim 7, wherein said strands are high density polyethylene (HDPE).

9. The geocomposite of claim 7, wherein said geotextile is non-woven needlepunched textile heat laminated to strands on both sides of said geonet.

10. The geocomposite of claim 9, wherein said strands are high density polyethylene (HDPE).

11. The geocomposite of claim 4, wherein said geotextile is spun-bonded or heat laminated textile heat laminated to strands on both sides of said geonet.

12. The geocomposite of claim 11, wherein said strands are high density polyethylene (HDPE).

13. A landfill comprising alternating layers of fill and geocomposites, said geocomposites each disposed beneath a layer of fill to facilitate draining of liquid from the landfill and comprising:
    a geonet consisting of
        a first plurality of substantially parallel strands, and
        a second plurality of substantially parallel strands disposed on top of said first plurality of strands, said second plurality of strands being at an angle relative to said first plurality of strands,
        whereby said first and second plurality of strands are secured to one another by connected areas at crossover locations, and at least one of said first and second plurality of strands is substantially round in cross-section; and
    a geotextile bonded to both sides of said of said geonet.

14. The landfill of claim 13, wherein said strands are high density polyethylene (HDPE).

15. The landfill of claim 13, wherein both of said first and second plurality of strands are substantially round in cross-section.

16. The landfill of claim 13, wherein said geotextile is non-woven needlepunched textile heat laminated to strands on both sides of said geonet.

17. The landfill of claim 16, wherein said strands are high density polyethylene (HDPE).

18. A geonet for use in a geotechnical construction site, consisting of:
    a first plurality of substantially parallel strands substantially uniformly spaced from one another;
    a second plurality of substantially parallel strands substantially uniformly spaced from one another and disposed on top of said first plurality of strands, said second plurality of strands being at an angle relative to said first plurality of strands;
    whereby said first and second plurality of strands are substantially incompressible and secured to one another by connected areas at crossover locations, and at least one of said first and second plurality of strands is substantially round in cross-section.

* * * * *